United States Patent [19]
Eder et al.

[11] Patent Number: 5,518,806
[45] Date of Patent: May 21, 1996

[54] FOAMED MATERIAL PANEL, IN PARTICULAR A SHAPED PART CONSISTING OF ONE OR SEVERAL FOAMED MATERIAL PANELS

[75] Inventors: Bernhard Eder, Linz; Günther Priestner, Steyr, both of Austria

[73] Assignee: C. A. Greiner & Söhne Gesellschaft m.b.H., Kremsmünster, Austria

[21] Appl. No.: 82,242

[22] Filed: Jun. 24, 1993

[30] Foreign Application Priority Data

Jun. 25, 1992 [AT] Austria ............................ 1293/92

[51] Int. Cl.⁶ .................................................. B32B 7/02
[52] U.S. Cl. ................... 428/218; 428/310.5; 428/159; 428/170; 428/171; 181/288; 181/294
[58] Field of Search ................................ 428/159, 170, 428/171, 172, 310.5, 314.2, 316.6, 317.9, 218

[56] References Cited

U.S. PATENT DOCUMENTS 4,292,214  9/1981  Blount ............................ 260/9
4,863,791  9/1989  Steward et al. ................ 428/310.5

FOREIGN PATENT DOCUMENTS

| 376264 | 10/1984 | Austria . |
| 1629657 | 4/1971 | Germany . |
| 2460910 | 7/1977 | Germany . |
| 2729738 | 1/1981 | Germany . |
| 3403386 | 8/1985 | Germany . |
| 2040948 | 9/1980 | United Kingdom . |
| 2949948 | 9/1980 | United Kingdom . |

*Primary Examiner*—Christopher W. Raimund
*Attorney, Agent, or Firm*—Collard & Roe

[57] ABSTRACT

The invention describes a foamed material panel, in particular a shaped part composed of one or several foamed material panels. These panels consist of a soft and, if appropriate, elastic foamed material comprising cellular webs and/or cellular walls that are permanently deformed at least in some areas. A central area of the foamed material panel is plastically deformed to a higher volumetric weight than at least one intermediate area of the formed material panel.

21 Claims, 6 Drawing Sheets

FOAMED MATERIAL PANEL, IN PARTICULAR A SHAPED PART CONSISTING OF ONE OR SEVERAL FOAMED MATERIAL PANELS

BACKGROUND OF THE INVENTION

1. Field of the invention

The present invention relates to a foamed material panel, in particular a shaped part consisting of one or several foamed material panels.

2. The Prior Art

The present invention relates to a foamed material panel, in particular a shaped pan consisting of one or several foamed material panels of a soft and, if appropriate, elastic foamed material comprising cellular webs and/or walls which are permanently deformed at least in some areas.

According to GB-OS 2 040 948 a method has been patented for the manufacture of sound-absorbent foamed material panels respectively such a sound-absorbent foamed material panel that consists preponderantly of closed-cell foamed plastic. The method for the manufacture of sound absorbing foamed material panels is carried out in such a way that the finished foamed material panel is compressed mechanically to about 50% to 66% of its initial thickness, thus destroying the closed-cell foam structure or cell structure and breaking open the individual cellular webs between the individual cells. The compression of the panel respectively the breaking of the cell structure and the cellular walls leads to increased air permeability and therefore to better sound absorption. Compression of the panels occurs at temperatures below 120° C. A disadvantage in this method, however, is that due to mechanical stress of the cell structure, especially with different production qualities of the foamed material, it cannot always be ensured that the cellular webs and walls of the closed cells of the foamed plastic are indeed destroyed during this mechanical compaction and therefore, in many cases the desired sound damping cannot be achieved.

SUMMARY OF THE INVENTION

The object of the present invention is to produce a foamed material panel respectively to create a method for the manufacture of such a foamed material panel, which or by which the desired air permeability in foamed material panels with an appropriate number of open cells can be adapted to the desired soundproofing properties through modification of their cell structure.

This object of the invention is achieved if a central area of the foamed material panel or the shaped part is plastically deformed to a higher volumetric weight than at least one intermediate area of the foamed material panel or the shaped part positioned between said central area and the surfaces. The surprising advantage of this solution, which seems very simple, lies in that the basically open-celled central area of the foamed material panel can be compressed in a well-directed manner which results not only in an increase of density but also in a decrease of the cross-section of the air passage and therefore in a valve effect for the air passage in the form of a slowing down of the air sound passage. On the other hand, due to the increase in density, this central area acts at the same time as a structure-borne sound damping element and therefore, with a foamed material panel made from uniform foamed plastic, both requirements of the user can now be fulfilled, namely sufficient air sound as well as structure-borne sound damping. A further advantage of this solution derives from the fact that the central area which has been compressed to about 20 to 30 times of its initial density, extends from a transition zone into the marginal portions or zones, the density of which compared with the initial state remaining unmodified, and thereby achieving a progressive dampening or slowing down of the air flow by the sound. Furthermore, by compressing the central areas, a uniform compaction and increase in density over the whole cross-section of the panel is achieved.

A further advantageous embodiment is characterized in that the cellular walls or cellular webs in the central area of the foamed material panel are compacted thermally to a greater volumetric weight and higher density, whereby it is advantageous that through the thermal compression a permanent plastic deformation is achieved, which makes it possible that the sound characteristics can be kept for a long time even after the cooling of the foamed material panel.

Another development by which the central area is transformed into a profile element through plastic deformation is also advantageous, as a result of which a sandwich-like structural member with an integrated, plate-like structure in its central area can be produced from a one-piece foamed plastic block. By matching the density and the carrying properties of the reinforcing layer in the central area, different mechanical stresses of the soundproofing element can be eliminated in a simple way.

Another development describes that a compaction factor of the central area in comparison with one of the adjacent intermediate area in the direction of the surface of the foamed material panel or the shaped part, is between 5 and 50. By the variable adaptation of the compaction factor in the central area of the foamed material panel, the latter can be adapted easily to the most varying purposes with regard to its stiffness, strength and structure-borne sound damping properties, despite the fact that the same raw material can be used for the different spheres of application.

A further variant of the embodiment is characterized in that a volumetric weight in one of the marginal portions adjacent to the surface of the foamed material panel is approx. 40 kgs/m$^3$ to 500 kgs/m$^3$ whereas the central area (9) of the foamed material panel (1,31) shows a volumetric weight of approx. 1,200 kgs/m$^3$ to 2,500 kgs/m$^3$, which creates a structural member consisting of a solid structure in its central area, that is to say a full material, whereas its marginal portions being elastically resilient and elastically deformable, may portray the characteristics of a high-resilient foam.

In a development wherein a density of the foamed material panel is diminishing from the central area towards the surface, it is advantageous that by virtue of the density range extending outward of the central area, a symmetrical mounting of a foamed material panel can be achieved easily without any additional measures.

Another variant of an embodiment according to which one or several of the surfaces of the foamed material panel have a higher density compared with an intermediate area between the central area and the marginal portions due to thermally deformed and compacted cellular walls and/or cellular webs or cell structure, has the advantage that a distribution of air and sound damping properties over the surface and the central area of a foamed material panel may be adapted to requirements for strength, such as resistibility of the surface for example, and that such foamed material panels can be easier adapted to different cases of application because of their resistive strength.

By virtue of the development, wherein reinforcing elements are inserted and/or embedded in the central area and/or the intermediate area or areas, an increase in strength respectively in the structure-borne sound damping properties can be created independently from the compaction of the foam structure within the foamed material panel by the use of reinforcing elements. Moreover, this includes also that sufficient strength is available to assemble such foamed material panels with enough tear-out strength under extreme conditions of application.

An advantageous embodiment according to which reinforcing elements are inserted and/or embedded respectively moulded or cemented on in the marginal portions of the foamed material panel, allows for a purposeful reinforcement of the individual surface zones, for example in order to attach on the back of the acoustical board a foamed material panel that is also more resistant against higher oscillation and acceleration forces as for example in motor vehicles, rail cars or airplanes.

An embodiment wherein the foamed material panel consists of a high-resilient foam structure, allows advantageously for a large variety of the properties of a finished foamed material panel with highly elastic and self-resilient damping zones and solid, resistive zones in the central area, for assembly or structure-borne sound damping.

Due to another embodiment wherein the central area and/or the intermediate area and/or the marginal portions are provided with filling material, in particular waste plastics, the structure of the intrinsic material when under the action of pressure, sound or temperature can be adapted to different conditions withstanding these stresses due to its strength, elasticity and reflective properties.

The development according to which the filling material consists of foamed material granulates of a soft foamed material or waste plastics containing thermoplastic, respectively mineral and thermosetting impurities, allows for the reutilization and exploitation of plastic scraps possibly having a higher unit weight so that in the compacted zones of the foamed material panel a solid increase in unit weight and stability can be achieved.

Advantageous is also the development according to which the foamed material panel consists of several individual panels, preferably having a different volumetric weight and/or density and/or cell structure and/or materials, which are joined together by an adhesive and/or foaming and/or shaping process, since for the individual zones of the finished foamed material panel different, and for each sphere of application adapted basic and raw materials can be used. Furthermore, by using several individual panels, the insertion of reinforcing elements into the foamed material panel is facilitated.

The embodiment according to which the reinforcing elements consist of aluminium or synthetic components of fibers, threads and/or plates and/or profiles, makes it possible to connect the individual panels of the formed material panel, respectively their central areas are heated by energy radiation, for example by means of microwaves or high frequency radiation.

A development wherein the reinforcing elements are formed of steel with special alloys, in particular nets and/or grids of such materials, which allows for the placing of high-strength materials that still permit a treatment of the foamed material panel with energy radiation.

The invention also describes a method for the production of foamed material panels, in particular shaped parts consisting of one or several foamed material panels from soft, respectively elastic foamed material, whose cellular webs and/or walls are subsequently at least in some areas partially destroyed and/or permanently deformed under the action of pressure and/or temperature.

This method is characterized in that the foamed material panel is subjected to energy radiation preferably under the action of pressure and compaction, which causes warming up or heating of the material components of the foamed material panel from the central area towards the marginal portions due to the release of oscillating energy to the molecules. The advantages of this method derive from the fact that uniform heating at very high temperatures, and therefore with high energies, can take place extending from the central area of the foamed material panel towards the surface areas without any detrimental modifications, destruction or burning of the surface layers of the foamed material panel. This reduces to a large extent the production time for the compaction and manufacture of a heavy layer inside a foamed material panel and creates a controlled increase in density in the central area. At the same time, both the period during which the foamed material panel after heating of the cell structure or of the area to be compacted must be kept under pressure and the period of action of the energy supply from 10% to 20% of the production time required up to that point, can be shortened.

The measures according to which the energy radiation is formed by high frequency radiation or a microwave and is preferably in the range of 20 Mhz to 40 Mhz, allow for the use of heating devices already known from the prior art so as to achieve the desired heating and compaction effect of the formed material inside the foamed material panel.

An advantageous method, according to which the cellular fabric or the waste plastics or foamed material granulates incorporated in the foamed material panel or the high-resilient foam are heated above their freezing point in the central area of the foamed material panel and are plasticized at least on their surfaces, whereupon they are compacted particularly to a plate-shaped profile element under the action of pressure and compaction of the foamed material panel and the pressure on the foamed material panel is subsequently retained until the plasticized cellular walls or cell structures of the waste plastics or foamed material granulates are at least partially cooled down below the freezing point, has the advantage that in conjunction with the above described process, the treated product or foamed material panel is cooled immediately after the action of energy radiation or can be permeated with cold air to reach the congealing point in a shorter period of time, since no heated, panel-shaped elements are required to bring in the temperature.

According to the method by which prior to the manufacture of the foamed material panel, thermoplastics and/or thermoset plastics and/or textiles and/or minerals filling materials are added to the raw material in a ground, torn up or cut up form to produce a foamed plastic material, the strength of the foamed material panels can be modified optionally by adding waste plastics.

When proceeding with filling materials having a maximum flock size of 125 mm$^3$, even when filling materials are added, sufficient adhesion and connection of these individual parts is still ensured by the newly added foamed plastic.

The measures by which before or after the profile element has been produced in the press mould, the continuous openings are made between the uncompacted marginal portions, respectively the central area and the surface, result in good aeration of the foamed material panels to which filling materials have been added and which are therefore more dense.

Finally, when proceeding according to the measure wherein the heating temperature in the central area or the marginal portions that are to be thermally compacted, is above the freezing temperature of the majority of the plastic material added as filling materials, it is advantageous that the used aggregate can also be sufficiently thermally compacted.

BRIEF DESCRIPTION OF THE DRAWINGS

The invention will now be described further hereinafter, by way of example only, with reference to the accompanying drawings, in which.

DETAILED DESCRIPTION OF PREFERRED EMBODIMENTS

Figure 1:
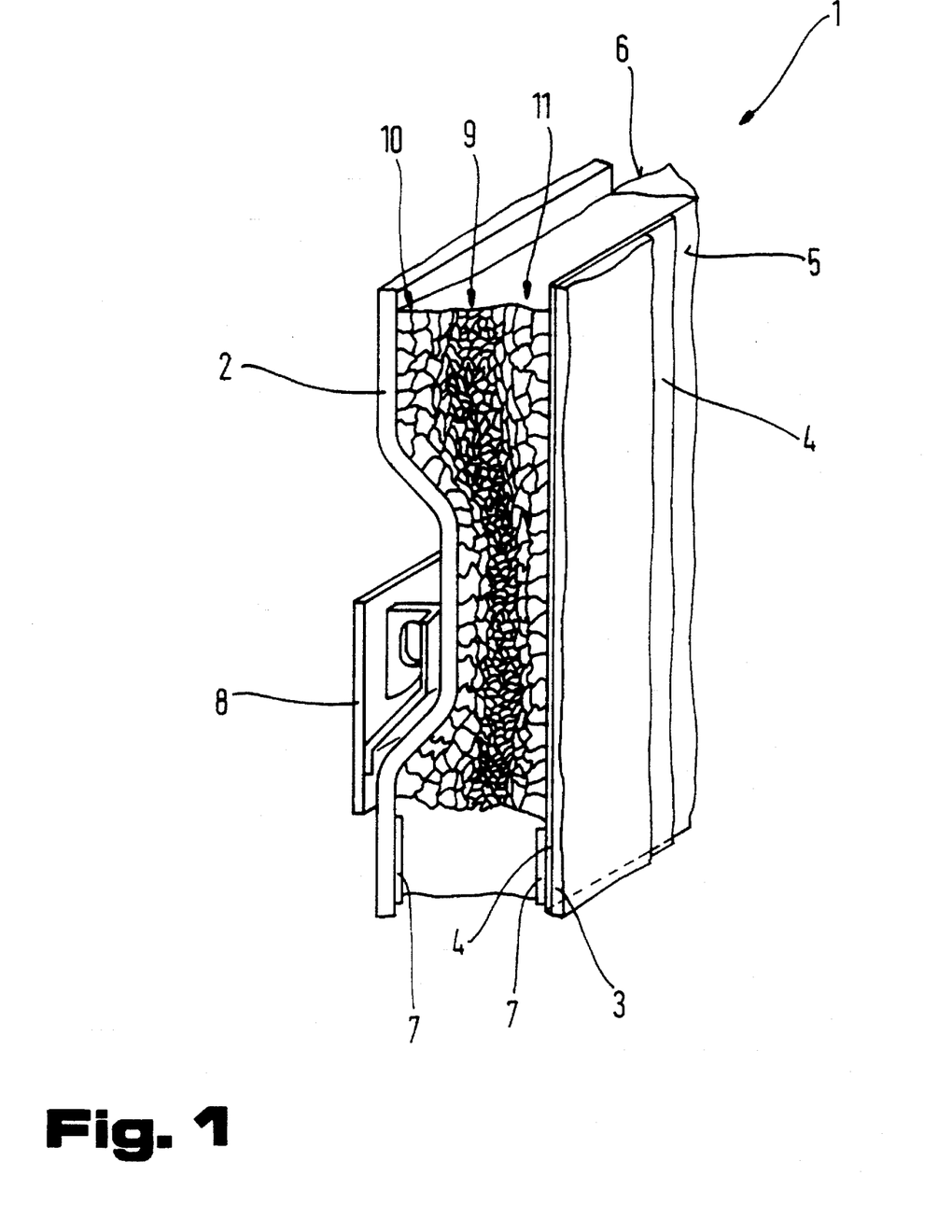
FIG. 1 is a schematic, simplified illustration and a sectional front view of a foamed material panel in accordance with the invention.

FIG. 1 shows a foamed material panel 1, developed as a shaped part. This foamed material panel 1 as shown in the example of the embodiment is connected with two surface layers 2,3. The connection between the surface layers 2,3 and the foamed material panel 1 can occur in any way possible. It is therefore possible to connect them by means of an adhesive layer 4. The adhesive layer must not be applied all the way through and on the entire surface but can just as well be connected to the foamed material panel 1 by adhesive zones distributed over a surface 5 or 6. The bonding of the surface layers 2, 3 with the foamed material panel 1 can also take place by fusible adhesive foils, fusible adhesive powder or so called prepregs. Fusible adhesive powders consist mainly of phenolic resin powder which serves as an adhesive but also as an additional reinforcement of the foamed material panel. On the other hand, the fusible adhesive foils are often polyethylene foils or polyurethane adhesive foils. Prepregs on the other hand, are at room temperature and under local atmospheric pressure on their surface nonadhesive embeddings which, if necessary, can be reinforced with fibers or threads, fabrics, nets, grids, etc. Under the action of pressure and temperature the adhesive in these prepregs is activated and displays its adhesive effect. Moreover, it is likewise possible that the adhesive or plastic material, in most cases foamed plastic, contained in these prepregs liberate gasses under the action of pressure and temperature that cause foaming of the adhesive respectively the plastic material as is the case with an expanded plastic and which produce a tight bond with the layers in the vicinity of these prepregs or adjacent thereto.

Reinforcing elements 7, for example inserted metal plates can be provided in the surface areas 5, 6 to fasten further structural members in these areas respectively to connect the foamed material panel 1 with fixing parts 8.

The foamed material panel 1 comprises a central area 9 and two marginal portions 10, 11.

Figure 2:
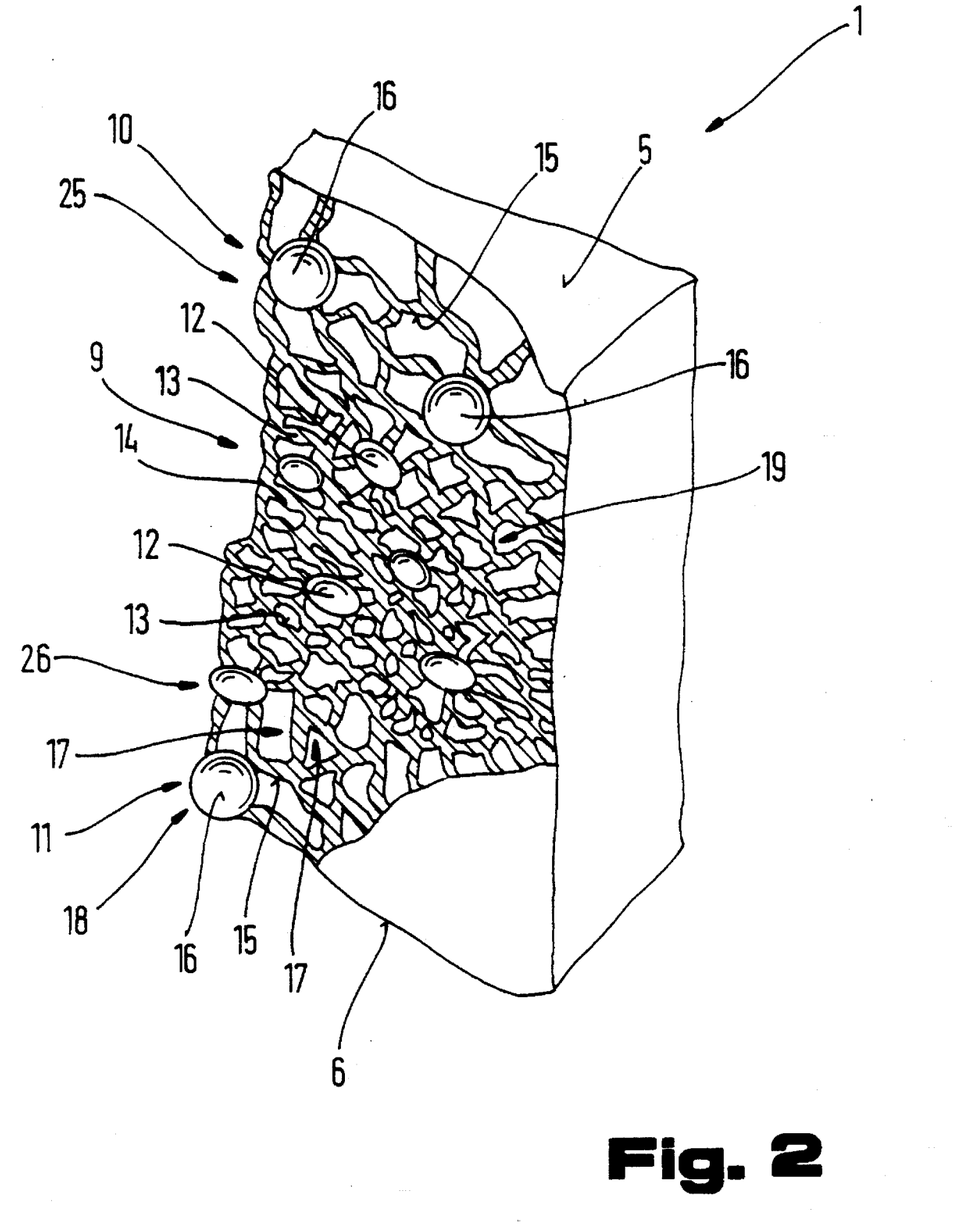
FIG. 2 is a simplified, schematic illustration of a part of the foamed material panel in accordance with the invention illustrated in FIG. 1.

As shown in FIG. 2, the central area 9, enclosed by the two marginal portions 10, 11, consists of spatially deformed cellular walls 12 and cellular webs 13, 14. In the marginal portions 10, 11, however, the cellular webs 15 and the cellular walls 16 remain in their initial state, essentially almost unchanged by the foaming process and consist of a spatial framework which forms the foamed material 19 consisting preponderantly of open cells 17 and very few closed cells 18. This foamed material 19 is composed of soft foam for example, such as polyurethane or polyether foam or other similar respectively equivalent materials. This soft foam which is usually produced in the same way as a block foam, is then distributed to individual foamed material panels 1 by well known cut-off processes.

In comparison with the marginal portions 10, 11, the central area 9 presents a substantially higher density since the cellular walls 12 and the cellular webs 13, 14 under the action of pressure and simultaneous heating are compacted or deformed and the air space between the individual cellular webs 13, 14 and the cellular walls 12 is thereby decreased in comparison with the cellular walls 16 and the cellular webs 15 in the marginal portions 10, 11. This causes in the central area a so called "cracking" process, which is also known as thermal cracking.

During this process it can be advantageous if the formed material panel is not only heated in its central area 9 but also in the area of its surfaces or at least in one of its surfaces or the surrounding lateral edges. This reduces the emission of heat energy from the heated central area into the marginal area respectively supports in addition the heat increase in the central area 9. The advantage of this solution in comparison with an overall heating of the foamed material panel 1 on its surfaces 5, 6 is that the required heat energy for heating the surfaces while simultaneously heating the the central area 9 of the foamed material panel 1, is less and therefore no high temperatures are required, which could lead to the destruction or burning of foamed material particles in the vicinity of the surfaces 5,6.

Due to the compaction of the cell structure of the foamed material panel 1 under the action of temperature and pressure, the volumetric weight of the central area 9 can be 5 times to 30 times, preferably 20 times, namely between 1,200 kgs/m$^3$ and 2,500 kgs/m$^3$ as much than the volumetric weight in the marginal portions 10, 11 of approximately 40 kgs/m$^3$ to 500 kgs/m$^3$.

By transforming the cellular webs 13, 14 or the cellular walls 12 into their plastic state or into a state whereby the surfaces are softened to such an extent that they become sticky, a permanent deformation and compaction of these cellular webs 13, 14 or cellular walls 12 is achieved, which during the following stiffening leads to the formation of a panel in the form of a multiple fiber plate. This large number of cellular webs which are deformed and felted with one another, forms therefore a very strong fibrous structure for the plate-like stiffening of the foamed material panel 1 in the central area 9.

This plate-like stiffening of the foamed material panel 1 in the central area 9 can be between 0.5 mm and 5 mm thick, if necessary even thicker. The whole thickness of the foamed material panel 1 can be adapted to any required conditions of application and may be between 2 cm and 20 cm. In this connection, it is of course also possible by means of adequate heating of the surface areas of the foamed material panel 1, to achieve compaction or deformation of the cellular webs not only in the central area 9 but also in the surface areas, respectively to carry out thermal cracking to reinforce the surface areas of the foamed material panel 1, or to achieve the desired strength or sound damping properties, etc. The different strengths of the various layers of the foamed material panel 1 cause the formation of a sandwich-structure and therefore a more stressable structural member. Furthermore, by simultaneous heating of the surface areas a deformation, in particular a spatial deformation is achieved.

After falling below the congealing point, the deformed cellular webs 13, 14 and the cellular walls 12 are fixed in their compacted and inter-connected form, which ensures that the desired density in the central area 9 will be retained.

Whilst the cell structure is compressed in the central area 9 the passage volume or the cross-section of the air passage is reduced, respectively the air is forced to make several detours through the deformed cellular grid and the airflow is therefore slowed down. This causes, depending on the compaction ratio in the central area 9, a corresponding slow-down and reduction as well as damping of the air sound and simultaneously, depending on the density increase in the central area 9 a structure-borne sound damping.

The capture of heat energy, respectively the heating of the central area 9 of the foamed material panel 1 for example, can now preferably take place with high frequency, middle frequency or infrared heating respectively by energy waves with mixed frequencies. Particularly when high-frequency radiation or so called microwaves are used, the structure to be heated is heated from the inside towards the outside, that is to say from its central area towards the surfaces 5, 6. This creates very good conditions to obtain in the two surface areas, elastically deformable, spring-like acting regions of the foamed material panel 1, whereas in the central area 9 a heavy layer respectively a mass layer can be formed to damp the structure-borne sound, which can be damped by means of the adjacent, elastic and spring-like acting uncompacted zones of the sandwich panel or its oscillation.

Heat energy to the surface areas of the foamed material panel 1 can be supplied by electrical heating bars or by the flow of hot water or oil from the shaping elements onto the foamed material panel 1. The advantage of the electrical heating bars is that they are quickly adjustable and that the heat supply to the individual panels can be precisely monitored. The required devices for the arrangement of electric heating elements respectively the heating with hot water or oil are just as well known from the art as the accompanying control devices to regulate and monitor the desired temperatures.

The heat energy to be supplied to the individual areas of the foamed material panels 1 must be dosed in such a way that the plastic material is not burned or completely liquefied, but rather that the individual cellular webs respectively walls are heated to such an extent that they lose their internal stiffness and are under the act of pressure plastic ally deformable without breaking. It is advantageous when they are heated to such an extent that they are plasticized on their surface, thus sticking or adhering to one another due to the adhesive force during the deformation process, so that the compacted position in the various areas of the foamed material panel 1 can be kept during the subsequent cooling process. These basic principles with regard to heat energy supply for the foamed material panel 1 refer of course to the example of an embodiment herewith described as well as to all other described embodiments.

Figure 3:
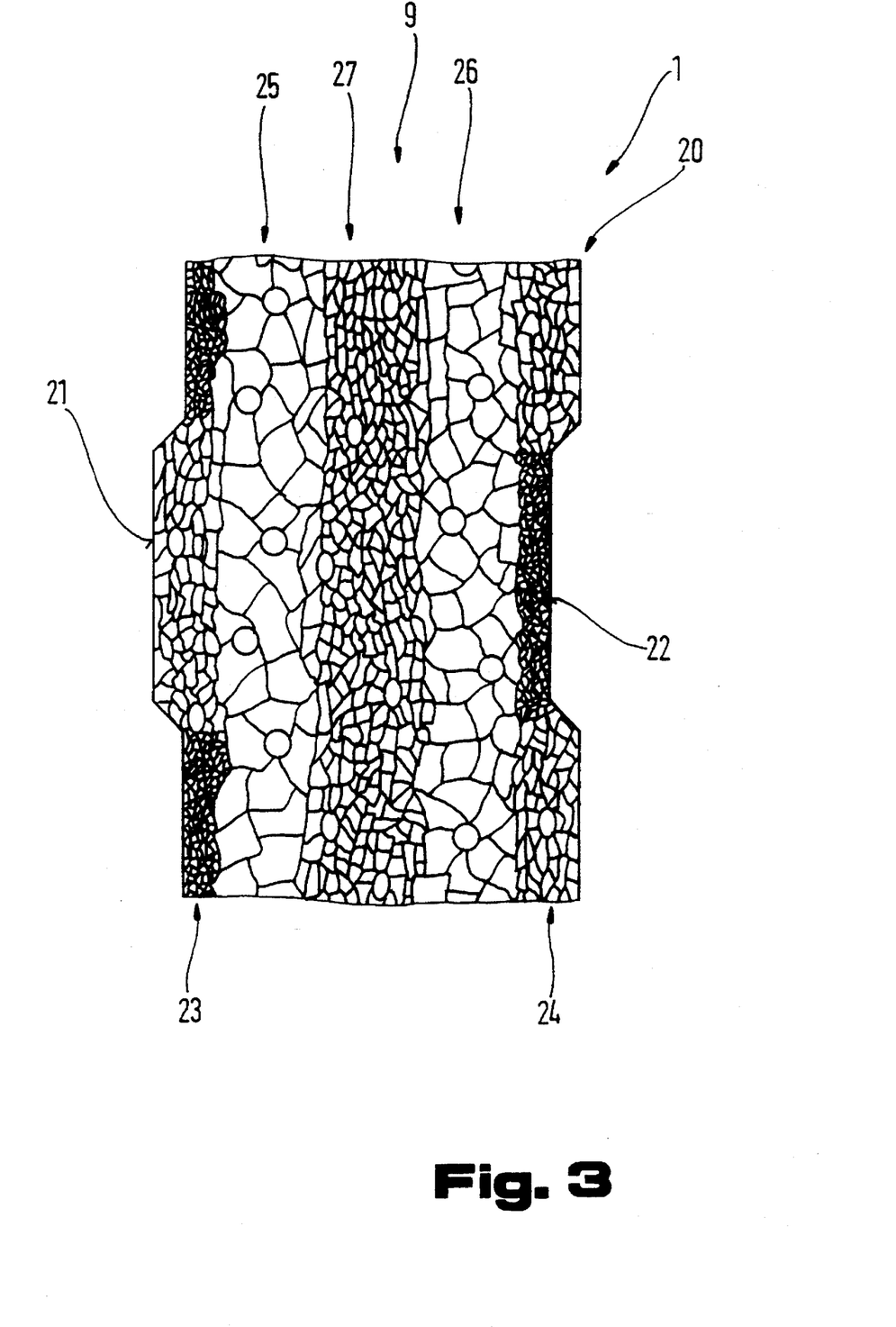
FIG. 3 is a sectional front view of a foamed material panel in accordance with the invention developed as a profile element.

FIG. 3 shows an embodiment of a foamed material panel 1 in the form of a profile element 20. This shows profiled surfaces 21, 22 just like in a trapezoidal profile, whereby the illustrated form has only been chosen as an example for a plurality of different surface formations.

This profile element 20 has been compacted respectively deformed several times through shaping from a straight plate, a block or panels formed from a block under pressure and simultaneous heating, so that compacted marginal zones 23, 24 for example, develop in the area of the surfaces 21, 22, and that intermediate areas 25, 26, are retained, which present towards the center of the panel the initial structure. A core zone 27 of the central area 9 of the profile element 20 shows a compacted cell structure, whereby depending on the compaction ratio of the core zone 27 in proportion to the marginal zones 23, 24 and the uncompacted intermediate areas 25, 26 a corresponding reduction and damping of the air sound is reached. Simultaneously, depending on the increase in density within the core zone 27 a structure-borne sound damping occurs. Due to the profiled embodiment of the surfaces 21, 22 a higher preparedness for emissions of sound reflections that depend on the compacted marginal zones 23, 24 is balanced out.

The profile element 20 which, due to the modification of the cell structure, in the various layers, is built up as a sandwich-structure, shows high internal stiffness and simultaneously also a high sound damping behaviour through which the profile element 20 is particularly suitable as a sound damping element in areas exposed to noise. Therefore, very few accessories are needed to support and hold the profile elements 20.

Figure 4:
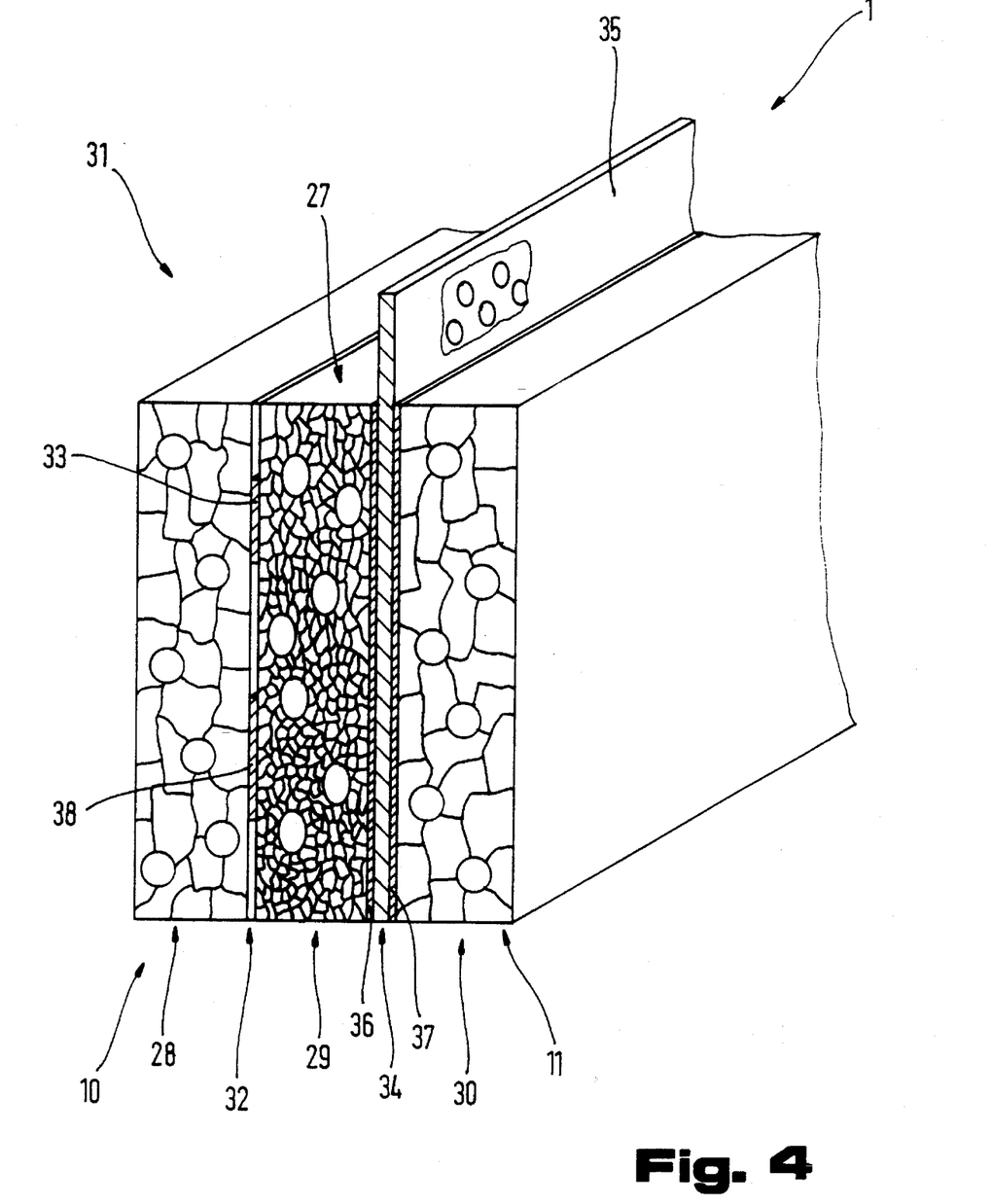
FIG. 4 is a partly sectional and simplified schematic illustration of a foamed material panel consisting of several individual foamed material panels in accordance with the invention.

FIG. 4 represents a foamed material panel 1 consisting of individual panels 28, 29, 30 which have several different cell structures. The individual panels 28, 29, 30 with an initial density are then compacted to different volumetric weight, whereby for example the individual panel 29 that forms the core zone 27 is compressed by deformation under the action of temperature and pressure to a high extent of density which is appropriate for structure-borne sound damping. The individual panels 28, 29, 30 that constitute the marginal portions 10, 11 represent thereby an uncompacted respectively low-densky cell structure. The individual panels 28, 29 in the connecting area 32 can be connected with one another by an adhesive layer 33 which may consists of an adhesive, a fusible adhesive foil or a fusible adhesive powder, which in turn can be applied over the whole surface but also partially, as illustrated. Furthermore, it is likewise possible to place between the individual panels 28, 29, 30 in a connecting area 34 a plate-like structural member 35, for example made of plastic such as hard PVC, etc. or of a wooden material or metal, possibly aluminium and to connect it with the individual panels 28, 29, 30 by means of adhesive layers 36, 37. This structural member 35 produced of a solid material may serve different purposes. It can for example ensure the required stiffness of the foamed material panel 1 and cause the structure-borne sound damping in the center of the foamed material panel 1.

An advantage for the production of the sandwich-like foamed material panel consisting of individual panels 28, 29, 30 with a structural member 35 embedded between them, is the use of an adhesive 38 which is activated under the effect of temperature. This makes it possible in one single operation to achieve a compaction of the individual panel 29 forming the core zone 27 under the action of temperature and pressure simultaneously bonding the individual panels 28, 30 respectively the structural member 35. This makes it possible that such a sandwich-like foamed material panel 1 can be produced in a cost-effective manner.

Figure 5:
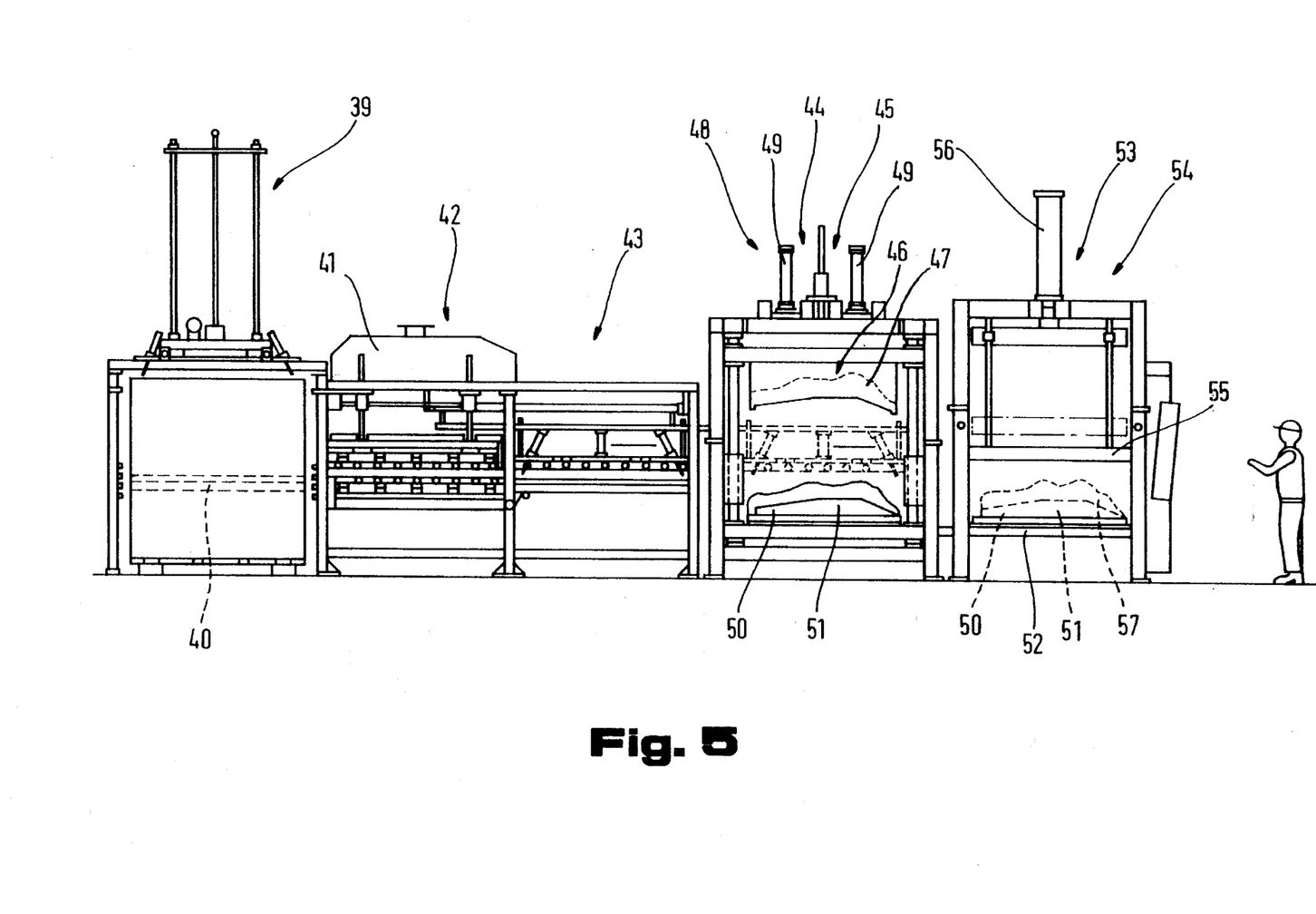
FIG. 5 is a simplified, schematic illustration of a plant for the production of foamed material panels in accordance with the invention.

FIG. 5 shows an installation that carries out the process in accordance with the invention. The foamed material block, produced in a block mould for example, is cut up into foamed material panels 1 with an appropriate cutter mechanism. These foamed material panels 1 are then by means of a manipulator 39 with a height-adjustable conveyer, in particular a belt conveyer 40, fed to a heating device 42, which is arranged behind the manipulator 39 and equipped with a high frequency oscillator 41. In this heating device 42, the stabilized foamed material panels 1 or foamed material blocks that were produced during the manufacture of foamed material blocks or foamed material panels 1 by way of foaming and subsequent cooling, are then inserted preferably in a two-part recess. For a predetermined period of time the foamed material panel 1 respectively the foamed material block is then by means of a high frequency oscillator exposed to high frequency radiation, in particular in the range of 20 to 40 Mhz. This high frequency radiation which incites the molecules to oscillate, causes heating.

Since the strongest resistance against the oscillation of the molecules occurs in the central area of the workpieces that are exposed to high frequency radiation, in particular the foamed material panel 1, the heating or calefaction ensues normally from the middle. Thereby, the open-celled cellular webs and the closed-celled cellular walls are heated and plastified so that they melt and become sticky at least in the surface area. The cracking of molecule chains is thereby induced by the effect of temperature and pressure exerted on the foamed material panel 1. The strong heating in the central area of the panel introduces spatial heat energy and prevents the formation of very short molecule chains, so that the material holds sufficiently together and that no oil crack products develop.

Under normal circumstances the portion of open cells in the foamed material panel 1 is much greater than the portion of closed cells, whereby in open-celled foamed plastic the number of open cells is in any case much higher than the number of closed cells.

Moreover, it is possible, but not absolutely necessary, that at least one of the surfaces or the surrounding lateral edges of the foamed material block respectively the foamed material panel 1 is also heated simultaneously. The heating of the surface zones usually takes place by heating the side walls inside the heating device 42 or the walls of the shaping press 44 that is arranged behind the manipulator 43 and employed for spatial deformation of foamed plastic material blocks or foamed material panels 1. The heating device 42 can also be developed advantageously as a heating press, whereby heating of the foamed plastic material block or the foamed material panel 1 can also take place under pressure in the vicinity of the heating device 42. The heating of the side surfaces in the heating device 42 or of the shaping press 44 may take place according to variants of embodiment known to the present state of the arts by using electric heating cartridges or commensurately heated liquids that pass through the side surfaces. An advantage of simultaneous heating at least of one or several surfaces and the surrounding lateral edges of the foamed plastic block or the foamed material panel 1 derives from the fact that a loss of heat energy towards the surfaces of the foamed material panel 1 can be avoided by heating these zones at the same time.

A further advantage of heating simultaneously the central area and the marginal zones derives from the fact that most of the heat energy is applied to the central area of the foamed material panel by energy radiation so that the temperatures in the vicinity of the heating plates for the surface of the foamed material panel 1 can be kept at a range below 200° C. to 250° C. These temperatures are sufficient to build up an appropriate heat accumulation inside the foamed material panel 1 so that the heat energy from the high frequency radiation cannot be emitted. This heat energy however, must not be as high as the one used during processes which need the total energy over the surface of the foamed material panel 1 for thermal compaction of the cell structure. This prevents the development of a greasy film consisting of oily crack products on the surface of the foamed material panel 1, which is caused by too much heat shortening the molecule chains and thereby preventing the required bonding of the material.

Moreover, commensurate preheating of the foamed material panels 1 or of the foamed plastic block in the vicinity of the surface or lateral edges can also result in compaction or thermal cracking in the surface areas if heated accordingly thus leading to consolidation or partial closing of the open cells in the surface area. This way, it is possible to manufacture foamed material panels as illustrated and described in FIG. 3 for example, which show higher densities in the surface areas 21, 22 as well as in the central area, respectively where the volume of the open cells is substantially less than in the intermediate zones 25 and 26 in between. Different temperatures of the shaping surfaces or for heating the central area 9 can be predetermined by manual adjusting devices on the control system of the installation or can be programmed automatically by computer in the form of an overall control and work program.

The degree of temperature to which the central area 9 respectively the surfaces 21, 22 are heated up depends not least on the structure of the aggregate contained in the foamed plastic block or the foamed material panel 1. As will be described further hereinafter, for foamed material panels 1, which contain waste plastics, for example also thermoset plastics or thermoplastics or chopped up or torn up residues of various foamed plastic materials, in particular such materials containing a certain amount of aggregate of which the solidification temperature or freezing temperature or pour point is higher than the one of the foamed plastic used for the production of the foamed plastic block or the foamed material panel 1, higher heating temperature or energy supply can be applied than for pure foamed plastics without any aggregate or waste plastics or recycling materials. Therefore, it is possible to produce sufficient compaction and bonding of the cell structure respectively cellular walls in a shaping press 44 arranged behind the heating device 42, which can be provided with hydraulic press plungers 45 for example. The shaping press 44 has a form tool 46 that is divided more or less in a horizontal plane whereby in particular an upper part 47 can be adjusted perpendicularly or towards the lower part 50 by a press drive unit 48, for example a hydraulic cylinder 49.

At the same time the lower part 50 of the form tool 46 is preferably developed as a punch female die 51 and positioned on a horizontal conveyer 52. When the form tool 46 is opened the lower pan 50, on which the deformed foamed material panel 1 is positioned, is transferred from the area of the shaping press 44 to a punching machine 53 arranged behind said shaping press, for example a hydraulic press 54 in which a punch male die 55 is positioned adjustably in the direction of the punch female die 51 formed by the lower part 50 and positioned motionally by means of a hydraulic cylinder 56.

Whereas in this form tool 46 the pressure exerted on the foamed material panel 1 which is at least in the core zone 27 heated above the freezing point and thereby causes compaction in this area respectively the deformation of the foamed material panel 1 according to the contours of the upper part 47 and the lower part 50, the foamed material panel 1 is cooled below the freezing point immediately after pressure had been applied by the form tool 46 and the structure of the assembly in the central area and/or the surface area is thereby fixed with the form tool 46 in a predetermined form. In particular, if the the foamed plastic block or the foamed material panel 1 has a substantial majority of open cells or if after its compaction in the form tool 46 there are still sufficient open cells, the cooling can take place at least in those areas where there are enough open cells, by blowing cool air through it, so that the heat energy in the heated shaping surfaces is not completely eliminated in order that the thermally cracked parts of the foamed plastic block or the foamed material panel 1 can be transformed. In any case the cooling of the foamed plastic block or the foamed material panel 1 must occur below the plastification point, so that the elastic resilience after the cracking process can be taken into account accordingly.

By virtue of the contour section performed in the punching machine 53, the contours that are predetermined by the contours of the punch female die 51 respectively the punch male die 55 of the transformed foamed material panel 1 take form, whereby after such a shaped body 57 has been punched and taken out of the form tool 46, the lower part 50 of the latter is brought back into its original position in the vicinity of the shaping press 44 by means of a horizontal conveyer 52 in order to transform the next foamed material panel 1 which has been heated in the meantime.

This configuration of the installation makes it possible that the process is carried out in accordance with the invention simultaneously providing a short cycle period and uniform product quality.

Figure 6:
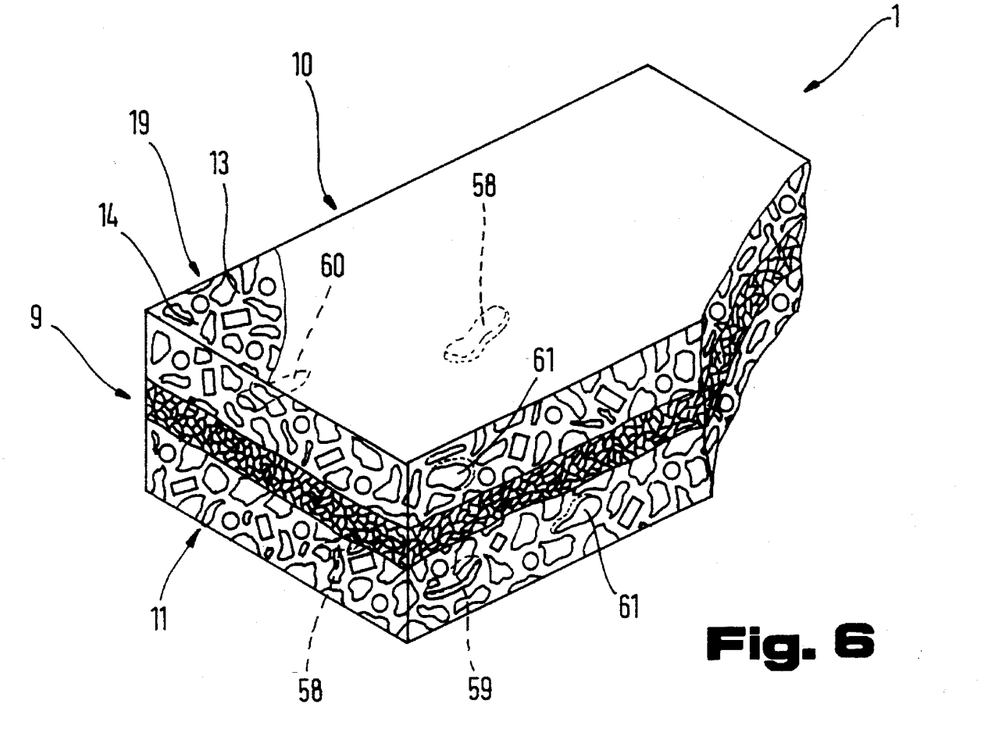
FIG. 6 is a partly sectional and simplified schematic illustration of another variant of an embodiment of a foamed material panel with filling material arranged inside the foamed material panel in accordance with the invention.

FIG. 6 shows a foamed material panel 1 in accordance with the invention, that has been produced from foamed plastic. For this purpose polyether, polymethane, phenolic or polyurethane foam with a volumetric weight of between 40 and 500 kgs/m³ can be used. In this, mainly open-celled, foamed material 19 from which cellular webs 13, 14 are schematically shown, filling materials 58, 59, 60, 61 are embedded that are shown schematically with different contours but only in the area of the uncompacted marginal portions 10, 11. These filling materials 58 to 61 are of course not only in the marginal portions 10, 11 but also in the central area 9. However, for the purpose of clarity of the drawing they were not shown in the central area 9.

The filling materials 58 and 59 may consist of reusable plastic scraps from foamed material, such as thermoset plastic in the case of the filling material 58, as well as the filling material 59 for example. This way, cut scraps of foamed plastic for example that emerge during production can be chopped or torn up into floccules by appropriate pretreatment and subsequently be foamed into the new foamed material panel 1 or foamed plastic block as filling material. Apart from PVC thermoset plastic, the filling materials 59 can also contain polyethylene, polyethylene terephthalate (PET), ABS, polyolefin, phenolic, polypropylene and polystyrene floccules. However, it is also possible to employ filling materials 60 which consist of textile scraps from synthetic or natural fibers. These textile scraps which consist also of small pieces or flocks may be recycling products from old carpets, clothes, curtains etc. Finally, it is also possible to use mineral materials such as chalk for example, or a similar product as a filling material 61 or to intermix it with fireretardant additives such as aluminium-hydroxide, etc.. In the event that the thermally compacted foamed material panel 1 that has been cracked at least in some areas, should have special consolidation properties or particular density ratios, it is also possible of course to incorporate threads or fibers, or fabrics made of such threads and fibers, woven textiles, nets or grids or fibers that have been adapted to a certain length.

These filling materials are mixed with the raw material before it is being put into a mould for the production of a foamed material panel 1 or as foamed plastic block and are therefore simultaneously distributed throughout the foamed material panel 1 or the foamed plastic block. During this process it is necessary to take into account that basic materials used for the production of the foamed plastic must not necessarily consist of newly acquired raw materials but can also be produced from recycling materials.

Figure 7:
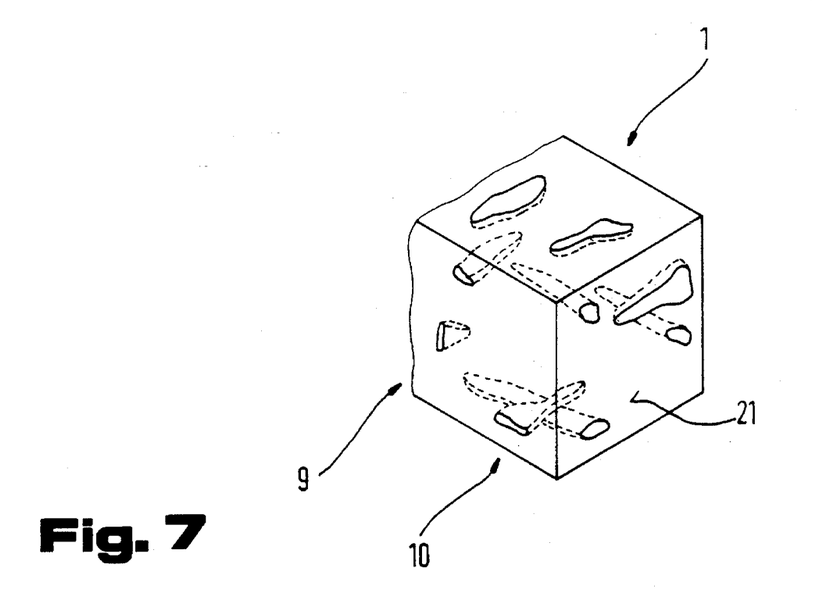
FIG. 7 is a simplified, schematic illustration of a section of a foamed material panel in accordance with the invention.

FIG. 7 shows that in addition to the central area 9, also in the vicinity of the marginal portions 10, 11, in particular in the areas adjacent to the surfaces 21, 22 a compaction of the cell structure can occur through thermal deformation or cracking. This illustration shows also schematically that despite the compaction in the marginal portions 10, 11 the surfaces 21, 22 are not entirely closed but that they are still showing a great number of open cells. However, in order to allow for a minimum of air permeability in the surfaces 21, 22 of such foamed plastic blocks or foamed material panels 1, provision can be made that the panels are perforated after thermal compaction took place.

By this process it is to be understood that heated needles or hollow pieces are pushed through the finished foamed plastic block or the foamed material panel 1 at least in the marginal portions 10, 11. This melts up hollow spaces through which the air can enter the undeformed open cells next to the surface areas of the foamed material panel 1 or the foamed plastic block.

Finally, it must also be noted that individual characteristics described by way of example in the individual embodiments, in particular those characterized in the subclaims, can also represent embodiments in accordance with the invention that are separate and independent from the others.

Furthermore, for better understanding of the embodiments in accordance with the invention they are partially illustrated schematically and unproportionally.

What is claimed is:

1. A foamed material part consisting of at least one foamed material panel of soft foamed material with cellular webs and cellular walls, the foamed material panel comprising
   (a) two surfaces,
   (b) two intermediate areas adjacent the surfaces, and
   (c) a central area between the intermediate areas,
      (1) the cellular webs and cellular walls of the central area being at least partly permanently plastically deformed, major portions of the cellular walls extending substantially parallel to the surfaces of the panel, and
      (2) the central area having a volumetric weight which is higher than that of the intermediate areas.

2. The foamed material part of claim 1, wherein the panel consists of elastic foamed material.

3. The foamed material part of claim 1, wherein the cellular walls and cellular webs in the central area of the foamed panel are compacted to a greater volumetric weight and higher density.

4. The foamed material part of claim 3, wherein a compaction factor of the central area in comparison with one of the adjacent intermediate areas is between 5 and 50.

5. The foamed material part of claim 4, wherein one of the intermediate areas has a volumetric weight of about 40 kgs/m$^3$ to 500 kgs/m$^3$ whereas the central area of the foamed material panel has a volumetric weight of approximately 1,200 kgs/m$^3$ to 2,500 kgs/m$^3$.

6. The foamed material part of claim 1, wherein portions of the surfaces of the foamed material panel have a higher density compared with the intermediate area adjacent thereto.

7. The foamed material part of claim 1, comprising at least one reinforcing element.

8. The foamed material part of claim 7, wherein the reinforcing element consists of an aluminum member.

9. The foamed material part of claim 7, wherein the reinforcing element consists of a synthetic component.

10. The foamed material part of claim 1, wherein the foamed material comprises a filling material in at least one of the areas.

11. The foamed material part of claim 10, wherein the filling material consists of waste plastics.

12. The foamed material part of claim 11, wherein the waste plastics contains at least one impurity selected from the group consisting of thermoplastic, mineral and thermosetting impurities.

13. The foamed material part of claim 10, wherein the filling material consists of foamed material granulates of a soft foamed material.

14. The foamed material part of claim 1, composed of several individual panels adhesively joined together.

15. The foamed material part of claim 14, wherein the several individual panels have a different volumetric weight.

16. The foamed material part of claim 14, wherein the several individual panels have a different density.

17. The foamed material part of claim 14, wherein the several individual panels consist of different materials.

18. A foamed material part consisting of at least one foamed material panel of soft foamed material with cellular webs and cellular walls, the foamed material panel comprising (a) two surfaces, (b) two intermediate areas adjacent the surfaces, (c) a central area between the intermediate areas,
  (1) the cellular webs and cellular walls of the central area being at least partly permanently plastically deformed, and
  (2) the central area having a volumetric weight which is higher than that of at least one of the intermediate areas, and (d) at least one reinforcing element inserted in the central area of the foamed material panel.

19. A foamed material part consisting of at least one foamed material panel of soft foamed material with cellular webs and cellular walls, the foamed material panel comprising (a) two surfaces, (b) two intermediate areas adjacent the surfaces, (c) a central area between the intermediate areas,
  (1) the cellular webs and cellular walls of the central area being at least partly permanently plastically deformed, and
  (2) the central area having a volumetric weight which is higher than that of at least one of the intermediate areas, and (d) at least one reinforcing element inserted in at least one of the intermediate areas of the foamed material panel.

20. A foamed material part consisting of at least one foamed material panel of soft foamed material with cellular webs and cellular walls, the foamed material panel comprising (a) two surfaces, (b) two intermediate areas adjacent the surfaces, (c) a central area between the intermediate areas,
  (1) the cellular webs and cellular walls of the central area being at least partly permanently plastically deformed, and
  (2) the central area having a volumetric weight which is higher than that of at least one of the intermediate areas, and (d) at least one reinforcing element consisting of an alloyed steel.

21. The foamed material part of claim 20, wherein the reinforcing element is a net of said alloyed steel.

* * * * *